SIGNAL REJECT CIRCUIT FOR MONITORING MIXED PLURAL SIGNALS

Filed Feb. 26, 1960 4 Sheets-Sheet 1

INVENTORS.
HARVEY ROSENBERG
JOHN W. STECKERT

BY James J. Wood

ATTORNEY

SIGNAL REJECT CIRCUIT FOR MONITORING MIXED PLURAL SIGNALS

Filed Feb. 26, 1960 4 Sheets-Sheet 2

INVENTORS.
HARVEY ROSENBERG
JOHN W. STECKERT

BY James J. Ward
ATTORNEY

SIGNAL REJECT CIRCUIT FOR MONITORING MIXED PLURAL SIGNALS

Filed Feb. 26, 1960 4 Sheets-Sheet 3

INVENTORS.
HARVEY ROSENBERG
JOHN W. STECKERT
BY
James J. Wood
ATTORNEY

SIGNAL REJECT CIRCUIT FOR MONITORING MIXED PLURAL SIGNALS

Filed Feb. 26, 1960 4 Sheets-Sheet 4

INVENTORS.
HARVEY ROSENBERG
JOHN W. STECKERT
BY James J. Wood
ATTORNEY

United States Patent Office 3,225,330

Patented Dec. 21, 1965

3,225,330

SIGNAL REJECT CIRCUIT FOR MONITORING MIXED PLURAL SIGNALS

Harvey Rosenberg, Drexel Hill, and John W. Steckert, Hazelton, Pa., assignors to Burroughs Corporation, Detroit, Mich., a corporation of Michigan Filed Feb. 26, 1960, Ser. No. 11,344
8 Claims. (Cl. 340—147)

This invention relates to monitoring circuitry, and more specifically to a signal reject circuit for utilization in graphic character recognition.

While the instant invention has utility wherever characters or symbols must be identified for intelligence purposes, nevertheless, the solution which it affords finds particular applicability in the high speed digital computer art. In many applications, a major obstacle arises in handling information at the input of the computer proper. The computing operations, arithmetic or otherwise, can usually be accomplished with substantial rapidity—the problem arises in feeding the input data with sufficient speed to keep the computer in active operation. Stated differently, the inherent advantages of fast machine operation are considerably nullified if many more hours must be spent handling and arranging the information to be fed to the computer.

A classic example of this type of data processing arises in the mechanization of banking problems. The use of checks in personal and business transactions has expanded enormously in the last decade, and there is every indication that the increase will continue in the years ahead. A rather small bank, for example, having from 15,000 to 50,000 checking accounts may be called upon to process from 20,000 to 75,000 checks daily.

After some preliminary studies, the Office Equipment Manufacturers Institute and the American Bankers Association recommended magnetic character recognition for use in banking practice, the standard characters comprising ten decimal digits and four coding symbols each designed to be sufficiently different for machine recognition, while retaining sufficient detail of their orthodox counterparts to enable visual recognition. The characters are magnetized, and the resulting magnetic field is caused to create flux linkages in a read head, the signal obtained being a function of the time rate of change of the flux linkages.

Each of the ten digits and four coding symbols has its own nominal readback voltage waveform, and the problem then arises to identify these waveforms with the accuracy demanded by banking practice. Recognition is complicated by the fact that since the check or other item contains many characters, one waveform is usually followed closely by another. Stated differently, since the waveforms are continuously varying with time, it is necessary to examine the waveform at the proper time to eliminate a spurious recognition. Further, there are departures from the nominal waveform because of such disturbances as malformation of the magnetic characters, or distortions in the formation of the magnetic characters because of rough handling of the item, and the like.

The technique for actually comparing a given readback voltage waveform with a stored representation for purposes of identification, is described in the copending patent application of Sheaffer, Jr. and Seif, entitled "Voltage Comparison Circuit," Serial No. 789,983, filed January 29, 1959, and assigned to the assignee of the present invention. The method and apparatus for determining the optimum time at which the comparison should be made is described in the copending patent application of Chow and Rosenberg entitled "Graphic Character Recognition," Serial No. 850,443, filed November 2, 1959.

The readback voltage waveform must be monitored in order to insure against spurious recognition signals. When the readback signal becomes too strong, the system becomes non-linear, so that identification is unreliable and rejection is required. The instant invention is addressed to a technique for rejecting strong readback signals.

In accordance with a preferred embodiment of the instant invention there is provided a signal reject circuit comprising in combination, mixer means adapted to receive and linearly mix a plurality of signals to be monitored, and to deliver a mixer output signal. AND gating means, enabled by a predetermined signal, are adapted for receiving the said linear mixer output signal, and for delivering a gating signal at its output. Comparator means are adapted for receiving the gating signal at its input, and for electrically comparing the amplitude of the linear gating signal with a fixed magnitude. The comparator means delivers a trigger signal when the fixed magnitude is exceeded. Univibrator means are coupled to the comparator means for delivering an output monitoring signal of fixed time width upon receipt of the triggering signal.

Accordingly it is an object of this invention to provide a monitoring circuit in which input signals which exceed a predetermined magnitude are reliably detected by the presence of a monitoring output signal.

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings in which:

In order to place the instant invention in proper perspective, it will be helpful to briefly review the principles upon which magnetic character recognition is bottomed. The basic problem of character recognition is to transform information from a series of printed characters and/or symbols into the binary form required by the computer logic. In the illustrative embodiment which will presently be described, the characters and symbols to be identified are printed in magnetizable ink. The item carrying this ink is then passed through a strong magnetic field to guarantee uniform magnetization, whereupon it is then passed under a read head. The magnetized ink causes flux linkages in the read head, the electrical signal from the head being proportional to the time rate of change in the flux linkages in accordance with the well known relationship:

$$e=-\frac{d\psi}{dt}$$

where $e$=the induced voltage and
$d\psi/dt$=the change in weber turns per unit of time.

The resulting waveform must then be identified.

Figure 3:
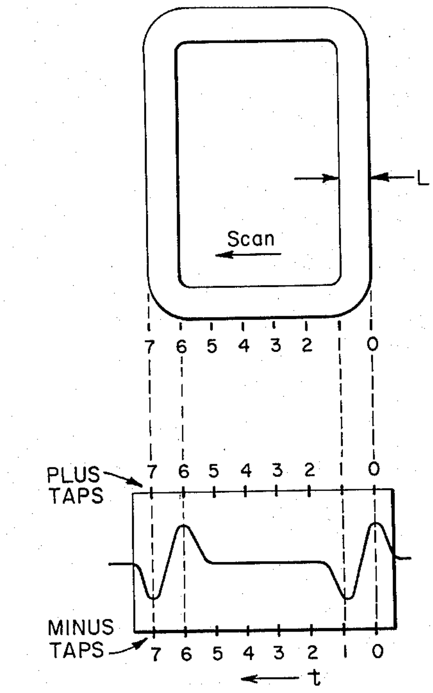
FIG. 3 is a view of the pointed character ZERO in accordance with the common language adapted by OEM—ABA, together with the identifying voltage vs. time waveforms.

In one particular application of character recognition—the mechanization of banking problems—the Office Equipment Manufacturers Institute and the American Bankers Association agreed upon a standard of character font consisting of ten decimal digits (0 . . . 9) and four coding symbols; they are designed to be sufficiently different for machine recognition, while still retaining such resemblance with standard formations as to be visibly recognizable. The waveform for the OEM—ABA standard "ZERO" is shown in FIG. 3.

There are three features of a readback voltage waveform which are used to identify a character: the position of the peaks in the character waveform, the polarity of the signal at various positions within the character, and finally the relative amplitudes of the peaks at these positions.

Figure 1:
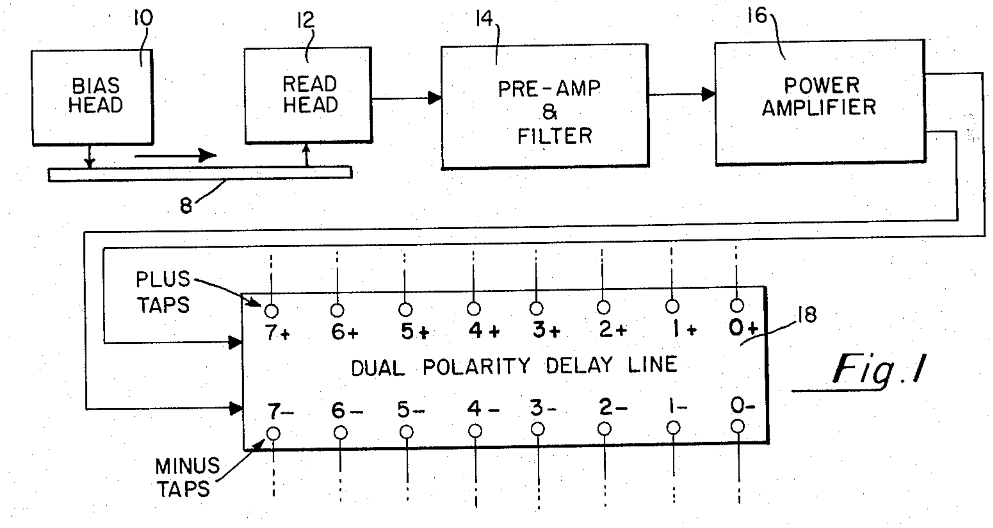
FIG. 1 is a block diagram depicting the development of the signal to be recognized, and its application to a delay line.

Referring now to FIG. 1 of the drawing, on item 8 (such as a check) bearing suitable characters or symbols in magnetizable ink is transported past a bias head 10 and a read head 12. The magnetizable ink on the item 8 is generally magnetically neutral when first printed. However, the printing may later come into contact with a magnetic field which may magnetize the ink in some random orientation. Since it is necessary to remove this spurious magnetization, the bias head 10 performs this function by overriding any previous magnetic history of the ink. By virtue of the relative polarities of the bias head and the read head, the first voltage peak of a character waveform in the time sense of FIG. 3 will always be positive, and the last peak negative. The low signal output of the read head is applied to a pre-amplifier and filter 14.

The basic character frequency is determined by the line width of the character (as defined in FIG. 3), and the velocity of the item past the read head 12. In the illustrative embodiment described herein, this frequency is 15.4 kilocycles. Since a single line width is the smallest dimension of interest, any frequency greater than 15.4 kilocycles is superfluous. Accordingly, in order to minimize noise such as that caused by discontinuities in the ink, the system signal path includes a pre-amplifier and filter 14 such that the system has a cut-off freqeuncy of 16 kilocycles. The signal is next applied to a power amplifier 16 and then to a dual polarity delay line 18.

The purpose of the delay line 18 is to provide dynamic storage of the character waveforms, with provision, by means of appropriate taps, for measuring the waveform amplitude at specific intervals. The dual polarity line 18 comprises lumped constant (L–C) sections which configuration provides dual polarity; the concept of dual polarity has reference to the availability of either polarity voltage waveform at any given tap interval along the line.

Figure 2:
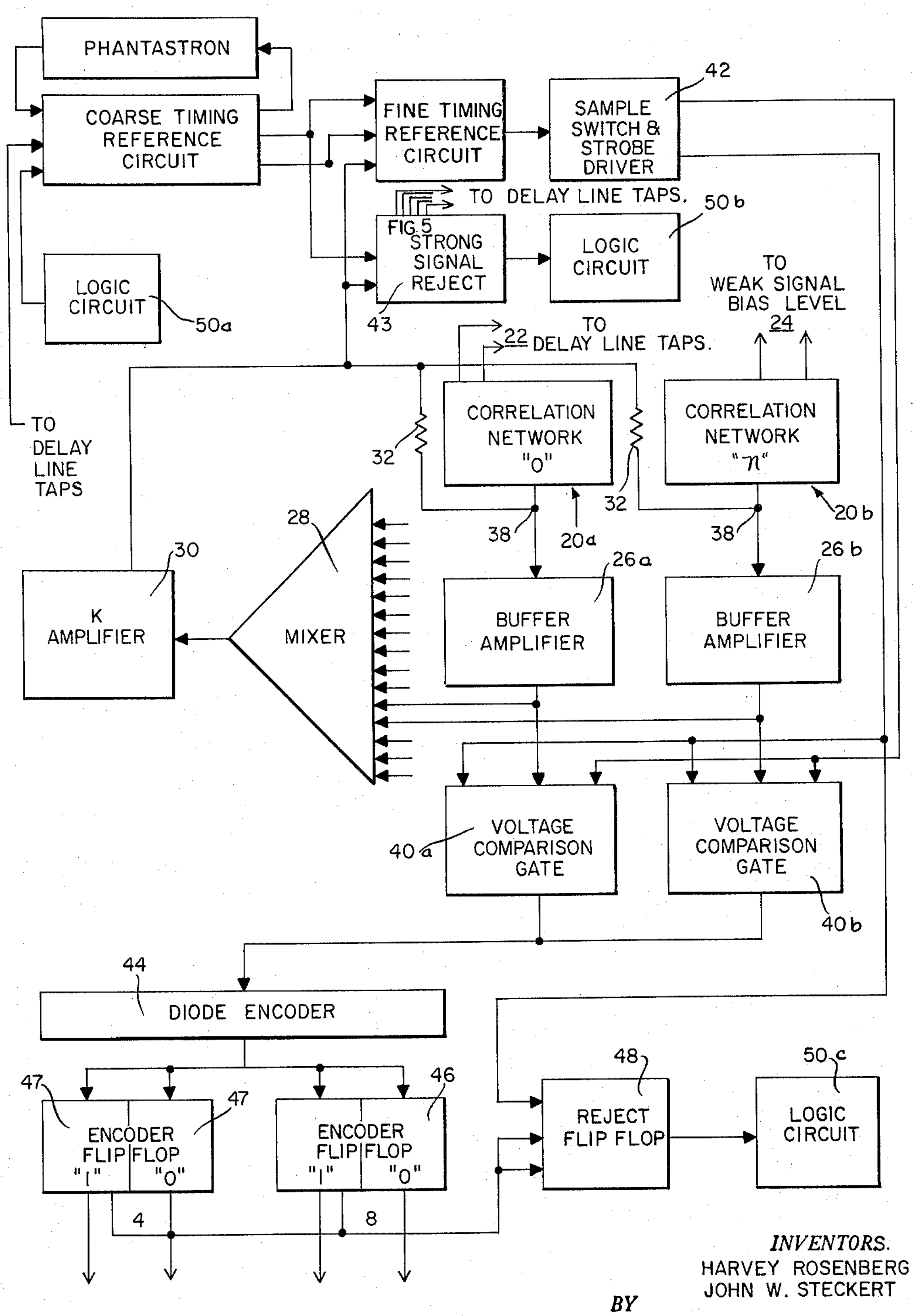
FIG. 2 is a block diagram supplementing FIG. 1, where FIGS. 1 and 2 considered together show the complete character recognition system.

Referring now to FIG. 2 of the drawings, correlation networks are indicated generally at 20*a*, 20*b*, there being one network assigned to each character or symbol to be read, and in addition there is also one for rejection purposes as will be explained presently. A correlation network and its associated circuitry we shall define as a channel. In FIG. 2 only two channels are shown in the interest of simplicity: a "0" channel and a reject or weak signal channel indicated generally at 22, 24, respectively.

The correlation networks 20*a*, 20*b* are resistor networks for performing algebraic addition. These networks are described in greater detail in the copending application of Sheaffer, Jr. and Seif for "Voltage Comparison Circuit," Serial No. 789,983, filed January 29, 1959. Briefly the networks store the ideal waveform of the digit or symbol to which they have been assigned. The various components of the network are connected to the dual polarity delay line taps in predetermined fashion. If the conductance values (G) of the resistive components of networks 20*a*, 20*b* are plotted as ordinates against the delay line taps as abscissa, by assigning a conductance to the abscissa value in accordance with the tap to which it is connected, it will be found that the plot is the nominal waveform signal, in sampled form, which is assigned to that network. For example, the correlation network of the "ZERO" channel 22 when so plotted would have the waveform shown in FIG. 3.

As the signal propagates along the delay line, various voltages are applied to the correlation networks 20*a*, 20*b* so that their respective outputs are changing in time. The problem is to determine the identity of the signal in the delay line. As described in the aforementioned copending application, this is accomplished by a waveform matching technique based on the auto-correlation and cross correlation functions of statistical mathematics, which give a maximum value for the condition of best match. The auto-correlation function is given by:

$$\phi_{11}(t) = \lim \frac{1}{2T}\int_{-T}^{T} f_1(\tau) . f_1(\tau + t)\, d\tau$$

where $f_1$ $(\tau)$ is any function of time and $f_1$ $(\tau+t)$ is the same function shifted by a time $t$, may be positive or negative.

It can be shown that the maximum value of $\phi_{11}$ occurs when $t=0$.

The cross correlation between $f_1$ $(\tau)$ and $f_2$ $(\tau)$ is given by $$\phi_{21}(t) = \phi_{12}(-t) = \lim_{T\to\infty} \frac{1}{2T}\int_{-T}^{T} f_2(\tau) . f_1(\tau + t)\, d$$

It can be shown that $\phi_{21}$ $(t)$ can never be greater than $\phi_{11}$ (0) and at best can only be equal to $\phi_{11}$ (0). On a statistical basis, at most times the function $\phi_{21}$ $(t)$ will be smaller than $\phi_{11}$ (0). Therefore when a signal is applied to its own correlation network, i.e. a "0" signal applied to a "0" correlation network, that output will be the greatest, and all others will be smaller, i.e. the output of a "0" signal applied to the 1, 2, 3, correlation networks, etc, will be smaller. The unlikely possibility of two correlation networks having outputs approaching the same magnitude is taken care of in a manner which will be explained.

The output of each correlation network 20*a*, 20*b* is applied to a buffer amplifier 26*a*, 26*b* having a gain very nearly equal to 1. The buffer amplifier is used for impedance matching, having an input impedance of 300K and an output approximately equal to 30 ohms. The output of each buffer amplifier is then fed to a diode mixer 28, the output of which is equal to the highest voltage received from any correlation network. The output from the diode mixer 28 is then applied to an inverting amplifier 30, from whence it is applied to the input of each buffer amplifier through a resistance 32.

Figure 4:
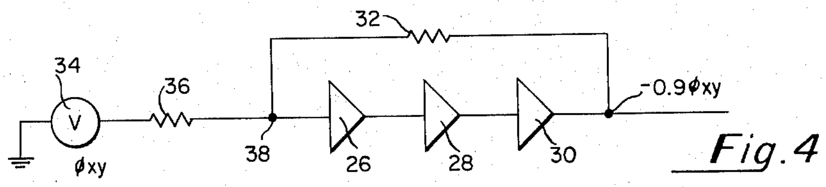
FIG. 4 is a block diagram showing how the buffer amplifier, mixer and inverting amplifier function as an operational amplifier.

As will be seen in FIG. 4, the buffer amplifier 26, diode mixer 28, inverting amplifier 30 and resistor 32 form a closed loop. The output of the inverting amplifier is −.9 of the highest equivalent voltage output of the correlation networks. The correlation networks 20*a*, 20*b* looking back from the input of amplifier 26*a*, 26*b* may be represented by a Thevenin equivalent circuit consisting of a generator 34 and a resistor 36. By design, the Thevenin equivalent resistance 36 will be equal for all correlation networks 20*a*, 20*b* and, in this particular embodiment, the resistance 32 is made equal to resistance 36. The generator voltage 34 will have a magnitude dependent upon the signal being applied to the associated correlation network.

Let the symbol $\phi$ represent the voltage output from any correlation network and two subscripts represent respectively the character under detection and the network to which it is applied. Thus $\phi_{23}$ means the voltage caused by the application of the character 2 to the correlation network 3 (we shall consider only the digit characters at this point, omitting the symbols). When reading the characters, if the outputs of the correlation networks 20 are examined at a precise time, which will be explained presently, the Thevenin generators will have voltages $\phi_{00}, \phi_{01}, \phi_{02}, \ldots, \phi_{09}$. The design of the correlation networks as described in the copending application of Sheaffer, Jr. and Seif, supra, $\phi_{00}, \phi_{01}, \phi_{02}, \phi_{03}, \ldots, \phi_{09}$). The resistors 32, 36, are in a 1:1 relationship so that the voltage at node 38 is one-half of the voltage of the Thevenin generator minus one-half of the output of the inverting amplifier 30. Thus if a "0" is in the delay line the voltage at the point 38 for the "0" network will be $$\frac{1}{2}[\phi_{00}-0.9\phi_{00}]=+.05\phi_{00}$$

If $\phi_{01}, \phi_{02}, \ldots, \phi_{09}$ are all less than 0.9 $\phi_{00}$, the corresponding point 38 on all the other correlation networks will be negative, and hence, one need only recognize which of these points is positive in order to identify the correct character. The factor 0.9 may of course be changed in magnitude; it is included here only by way of example.

In the process of identifying the voltage waveform in the delay line 18, the voltage comparison gates 40 are enabled by a signal from the sample switch and strobe driver 42. The sample switch and strobe driver 42 is described in greater detail in the copending application of Rosenberg for Sampling Circuit, Serial No. 57,428, filed on September 21, 1960 and assigned to the assignee of the instant invention. The single positive output from the correct buffer amplifier will pass through the appropriate gates 40*a*, 40*b* (FIG. 2) to a diode encoder 44 which will convert the waveform into binary form and apply it to the appropriate encoder flip-flops for temporary storage. In the illustrative embodiment, the identification is in the 8421 code. For simplicity only two encoder flip-flops 46 and 47 are shown representative of the places 8 and 4 respectively in the binary weighted code; it will of course be understood that in the actual embodiment two more encoder flip-flops are required for the 2 and 1 weighted places.

In the event that two buffer amplifier are positive, i.e. one of the correlation networks has an output magnitude greater than or equal to 90% of the correct correlation network output, then one or more of the encoder flip-flops will be pulsed on both inputs at the same time, which will cause a signal to be sent to the reject flip-flop 48, which in turn will send a signal to the logic cricuit 50*a* to ignore the reading. In the case of a banking operation, this means that the check or other item will not be processed automatically, but will be rejected for hand posting. In effect this provides for the statistical possibility of the cross correlation function approaching within a specific percentage of the auto-correlation function.

The character recognition system will also reject an item when the signal is too weak, i.e. less than 50% of nominal printing, and when the signal is too strong, i.e. greater than 250% of nominal printing. There are other causes for rejecting an item but they are controlled from the logic circuitry which inspects all information for completeness and correct format.

The weak signal rejection is accomplished by the addition of a fifteenth channel, i.e. the weak signal channel FIG. 2, 24. A weak signal D.C. bias level is applied which is equivalent to 90% of the weakest allowable signal. The correlation network 20*b* for the weak channel has an equivalent impedance which is the same as that of the other correlation networks. If the correct correlation network output falls below the weakest allowable value, an output will occur from both the "weak signal" and "correct signal" channels at sample time. An output from more than one channel is then interpreted by the reject flip-flop 48 and the logic circuit 50*c* as previously explained. If the signals are extremely weak such that the operational amplifier of FIG. 4 is only under the control of the weak signal bias, the item will be rejected because no output signals will be obtained from the fine timing reference circuit; the reason for this is that the fine timing reference circuit cannot operate with a D.C. level input—it responds only to waveform peaks.

When the signals become too strong the system becomes non-linear thus requiring additional means for rejection purposes. A strong signal reject circuit is indicated at FIG. 2, 43, this circuit is described in greater connection with the description of FIG. 5. Briefly, the circuitry monitors the regions where strong signals may develop viz. at the output of the "K" amplifier FIG. 2, 30 and the output of the power amplifier FIG. 1, 16 by means of certain delay line taps.

Before describing the strong signal reject circuitry of the instant invention, the overall description of the system will be completed. The digits and symbols on the items are read continuously, the resulting characteristic voltage waveform being applied to the delay line 18. The process is a continuous one. As the characteristic waveform traverses the delay line, the voltage at any one tap varies continuously with time. Obviously there is one point in time when the waveform in the delay line is in the optimum position. The system is designed so that under ideal conditions, when the first peak of any given waveform is at the "0" tap, its corresponding correlation network will have its maximum output. However, in practical situations, because of certain variables such as poor printing or mutilations, etc., the waveform may be distorted, so that the maximum output from the correlation network in question will occur when the first waveform peak is in the region of the "0" tap (possibly slightly before or slightly after the zero tap). The copending application of Chow and Rosenberg for "Graphic Recognition Means," Serial No. 850,443, filed November 2, 1959, described a means for accurately determining the theoretical optimum time when the waveform should be sampled based on the correlation network outputs rather than when the first character peak arrives at a specific tap location.

The overall rationale of the timing technique consists of performing first a coarse timing function (developing a sample interval signal), and then a fine timing function within the sample interval. In effect, the coarse timing function states that a peak will occur within a given time interval (called the sample interval); in the practical embodiment herein described this is a time interval of 40$\mu$ secs. The fine timing function then comes into operation during this interval and determines when the waveform is in the optimum position for sampling.

Figure 5:
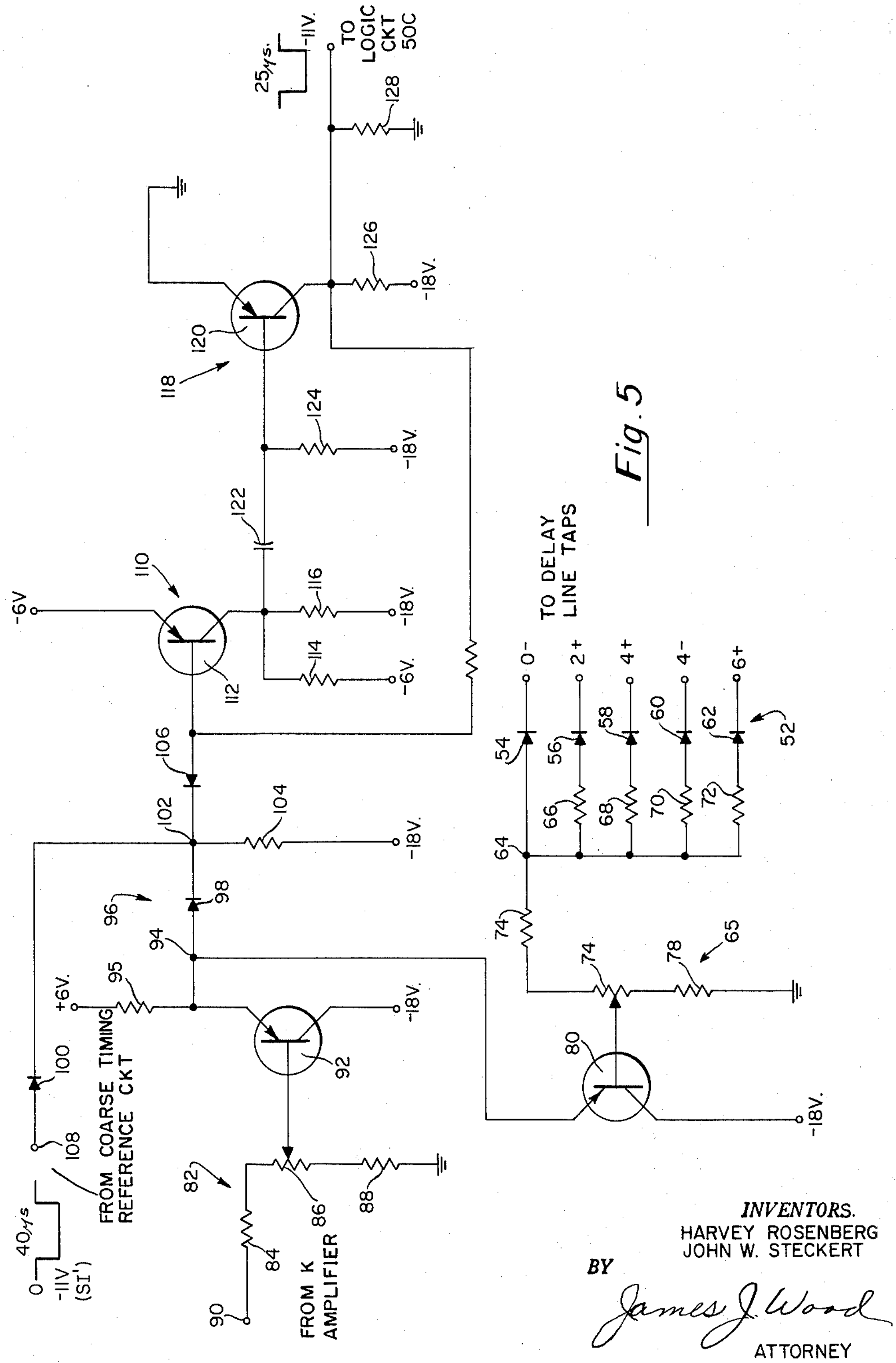
FIG. 5 is a circuit diagram of the monitoring circuit in accordance with the invention.
Figure 6:
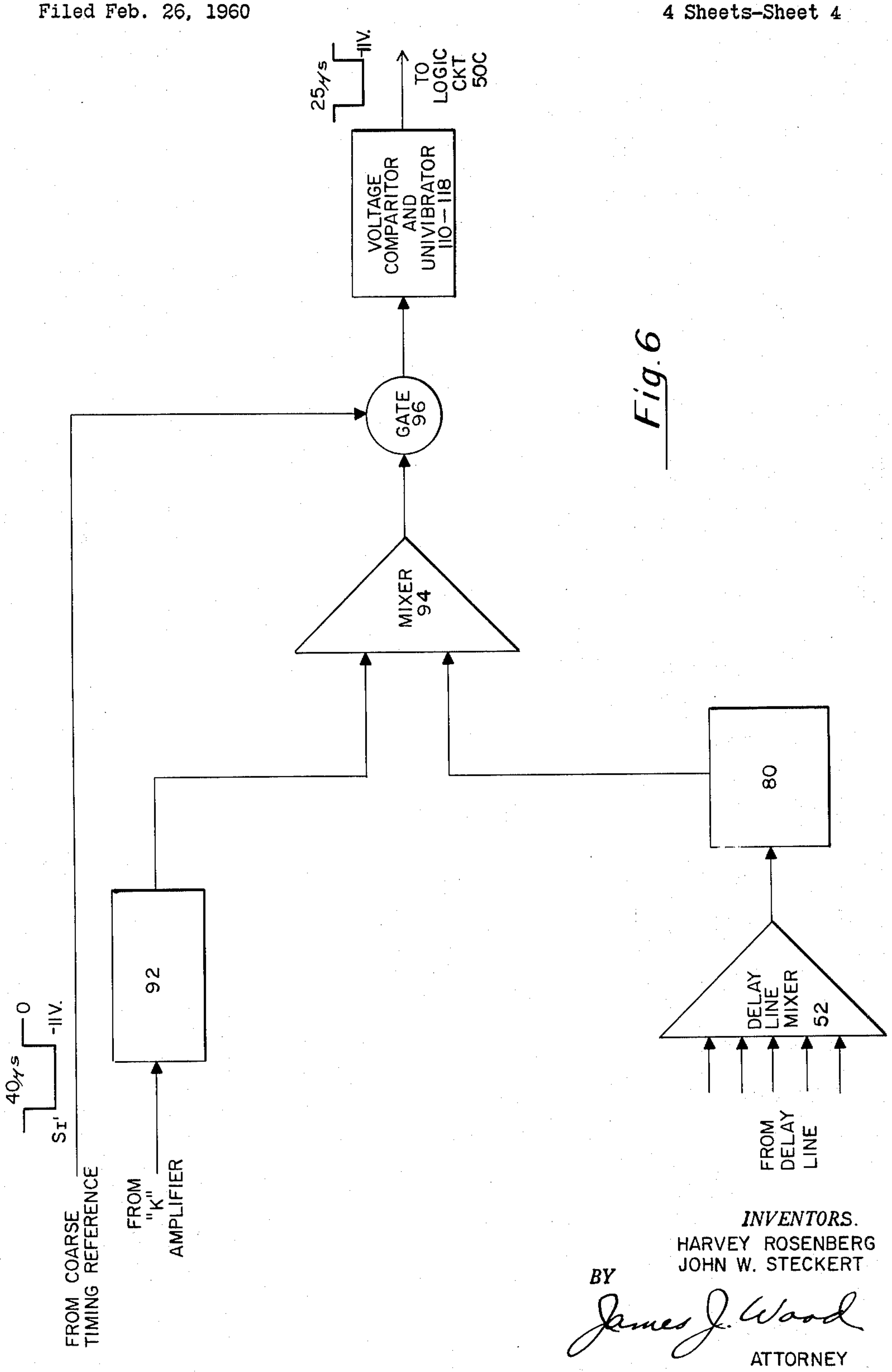
FIG. 6 is a functional block used in explaining the operation of the circuit of FIG. 5.

The strong signal reject circuit is shown in detail in the circuit diagram of FIG. 5 and in the functional block diagram of FIG. 6; these two figures will be considered together in the description which follows.

The objective of this circuitry is to prevent operation of the system beyond its dynamic range. Two possible places where strong signals may develop are: (a) at the output of the "K" amplifier (FIG. 2, 30) and (b) at the output of the power amplifier (FIG. 1, 16). In the practical embodiment here illustrated, the dynamic range of the system is exceeded when the output of the "K" amplifier is greater than −70 volts and also when the output of the power amplifier is greater than 130 volts peak. The "K" amplifier actually clips at 75 volts and so cannot perform the correlation process properly. The circuit about to be described has a built in safety factor since the circuitry will reject at −70 volts thus providing a 5 volt cushion.

The magnetic character fonts provide rejects of both the "K" and power amplifier types. For example, a power amplifier type reject may arise when sensing a character such as a 6 or a 9, which each have one peak which is large. A "K" amplifier type reject may arise where the character to be identified is a dash or a routing symbol. These characters do not have a single outstanding peak but instead have a number of peaks. Finally, there is an intermediate type of reject where a character, for example an 8, may partake of both waveform characteristics so that there may be likelihood of either type reject.

Since the strong signal reject circuit is active only during the sample interval (S.I.') the power amplifier cannot be monitored directly. Therefore the power amplifier output is monitored at selected taps along the delay line (FIG. 1, 18) and is applied to a negative diode delay line mixer indicated generally at 52. The selected delay line taps are: 0—, 2+, 4+, 4— and 6+ as indicated in FIG. 5. The taps have been chosen by examining all the waveforms and determining statistically where the large peaks are likely to occur. The mixer 52 comprises diodes 54, 56, 58, 60 and 62 having their cathodes connected to the delay line taps 0—, 2+, 4+, 4— and 6+, respectively. The anode of diode 54 is connected at anode 64. The remaining diodes have their anodes connected to one end of resistors 66, 68, 70 and 72, respectively, the other ends of the resistors being connected to the node 64. These resistors 66–72 are of various magnitudes, are placed in series with the respective diodes, and are designed to compensate for the attenuation of the signal as it is propagated along the delay line. Obviously no resistor is needed with the diode connected to the "0" tap because maximum attenuation has taken place. An attenuator, indicated generally at 65, comprises resistor 74, potentiometer 76 and resistor 78 connected between node 64 and ground as shown. The sliding contact of potentiometer 76 is connected to the base of a transistor 80.

The output of the "K" amplifier is applied to an attenuator indicated generally at 82 and comprises resistor 84, potentiometer 86 and resistor 88 connected between terminal 90 and ground. The sliding contact of potentiometer 86 is connected to the base of a transistor 92.

The monitored signals are attenuated with attenuation networks 65 and 82 so that the signal which causes rejection will be in the order of —6 volts.

The transistors 80 and 92, are arranged in the common collector configuration; positive potential for the emitters is supplied through common resistor 95. Because of impedance considerations some buffering of the input signals is necessary. The transistors 80 and 92, arranged in the emitter follower configuration, each serve as adequate buffers for their respective signal inputs.

The mixing of the negative signals is accomplished by paralleling the emitters of the transistors (connected at 94) with a common resistor 104 as will be explained presently. The mixed output is applied to an AND gate 96 which comprises diodes 98 and 100. The anode of diode 98 is connected to the emitters of transistors 80 and 92 connected in common at circuit point 94; the cathode thereof is connected to node 102. The common resistor 104 is connected between node 102 and a source of negative potential (—18 volts). The sample interval signal (S.I.') is connected to the node 102 through a diode 100, having its anode connected to terminal 108 and its cathode connected to node 102.

The output of gate 96 is connected to a voltage comparator means indicated generally at 110 through an isolation diode 106. The voltage comparator means 110 comprises a transistor 112 arranged in the common emitter configuration, with the base connected to the anode of diode 106; the cathode of diode 106 is connected to node 102. The collector of transistor 112 is connected to potential sources —6 v. and —18 v. through resistors 114 and 116, respectively. The emitter of transistor 112 is connected to a voltage reference source of negative potential (—6 v.) as shown. Transistors 112 and 120 comprise a univibrator circuit.

The collector of transistor 112 is coupled to the second stage of the univibrator indicated generally at 118. The stage 118 comprises a transistor 120 having its base coupled to the collector of transistor 112 through capacitor 122. Biasing potentials for the base and collector of transistor 120 is applied by means of resistors 124, 126 and 128, respectively. The collector of transistor 120 is connected to the base of transistor 112 through a resistor 130. Resistors 114 and 128 are for protective purposes to limit maximum collector voltage on transistors 112 and 120, respectively.

The operation of the signal reject circuit will now be described. Under standby conditions, transistors 92 and 120 are conducting while transistor 80 is biased slightly off. Transistor 112 is cut off; with transistor 120 conducting, its collector is substantially at ground, and hence the base of transistor 112 is near ground. The node 102 is substantially at ground because current is passing through diode 100 toward the —18 v. souce. In summary, the diode 98 is reverse biased, while diode 100 is forward biased. Diode 106 has approximately the same potential on both sides. Under normal conditions when the signals from the "K" amplifier and the power amplifier do not exceed the specified magnitudes, the transistors remain in these states of conduction.

The strong signal reject circuit only comes into operation, if at all, during the sample interval. This function is translated by means of an enabling signal applied to the AND gating means 96. More specifically, the sample interval signal (S.I.') applied to terminal 108, causes diode 100 to be cut off, thus permitting resistor 104 to attempt to pull node 102 in the negative direction. The negative swing is then clamped to the value of the input to diode 98 since it is less negative than S.I.'

The mixing function of the input signal is accomplished by paralleling the transistors 80, 92, i.e. the emitters are connected in common at node 94. The transistors 80 and 92 are arranged in the emitter follower configuration, so that the emitter follows the base. The transistors 80, 92 are so arranged that when the "K" amplifier signal input at terminal 90 does not exceed —70 v., and when the input to one or more of the delay line taps does not exceed —130 v., the input to diode 98 will not reach —6 v., which is required to trigger the univibrator means; the transistor with the most negative signal will cut off the other transistor.

Assume that a "K" signal of —75 v. is received. This will cause a negative going signal to appear at the emitter of transistor 92, exceeding —6 v., with the result that transistor 80 is cut off. The negative going pulse through diode 98 is applied to the base of transistor 112. The emitter of normally off transistor 112 is at —6 v. When the base of transistor 112 falls below —6 v., it conducts and its collector waveform sends a positive going triggering pulse to the transistor 120. More specifically, the triggering pulse passes through the capacitor 122 to the base of transistor 120 causing it to cut off. This action results in a negative going output pulse at terminal 132 as the collector of transistor 120 falls toward —11 v. The time constant of capacitor-resistor 122–124 determines the time width of the output pulse. The feedback path through resistor 130 maintains conduction in transistor 112. The anode of diode 106 is at a negative potential so that it is reverse biased for the duration of the time constant even should node 102 again rise to a slightly more negative voltage than —6 volts. Effectively then diode 106 serves to isolate the voltage comparator-univibrator 110, 118 for the time necessary to develop the output pulse at terminal 132.

The values and/or types of components and the voltages appearing on the drawings are included by way of example only as being suitable for the device illustrated. It is to be understood that the circuit specifications in accordance with the invention may vary with the design for any particular application.

Obviously many modifications and variations of the present invention are possible in the light of the above teachings. It is therefore to be understood that within the scope of the appended claims the invention may be practiced other than as specifically described and illustrated.

What is claimed is:

1. A signal reject circuit comprising in combination, a mixer-attenuation means having individual input terminals for receiving a plurality of signals from a dynamic source of electromagnetically stored signals representing an instantaneous pattern voltage waveform, and deliver a mixed-attenuated signal which is a function of the highest magnitude of said plurality of signals, additional attenuation means connected to receive power amplified signals and deliver an additional attenuated signal, buffer-mixer means for receiving both said attenuated signals and for delivering a mixed signal which is equal in magnitude to the higher of said both attenuated signals, AND gating means enabled by a predetermined signal and connected to receive said mixed signal and for delivering a linear gating signal at its output, comparator means connected to receive said gating signal at its input and for electrically comparing the amplitude of said linear gating signal with a fixed reference voltage and for delivering a trigger signal when said fixed reference voltage is exceeded, said fixed reference voltage being chosen in relation to the amplitude of said monitored signals so as to cause a trigger signal to be delivered when the instantaneous peak of one of said monitored signals exceeds a desired level, and univibrator means coupled to said comparator means for delivering an output monitoring signal of fixed time width upon receipt of the leading edge of said triggering signal.

2. A signal reject circuit comprising in combination, mixer-attenuation means having individual input terminals for receiving a plurality of signals from a dynamic source of electromagnetically stored signals representing an instantaneous pattern voltage waveform, and to deliver a mixed-attenuated signal which is a function of the highest magnitude of said plurality of signals, additional attenuation means connected to receive power amplified signals and to deliver an additional attenuated signal, buffer-mixer means for receiving both attenuated signals and for delivering a mixed signal which is equal in magnitude to the higher of both attenuated signals, AND gating means comprising first and second diodes each having an anode and a cathode, the anode of said first diode being connected to receive an enabling signal, the anode of said second diode being connected to receive said mixed signal, the cathodes of said diodes being connected to a common junction, delay multivibrator means, including an input and an output, voltage comparator means connected to receive said gated mixed signal and a reference voltage and causing said delay multivibrator means to be triggered when said gated mixed signal exceeds said reference voltage, isolation means connected to said common junction and to said voltage comparator means serving to block the path therebetween when said delay multivibrator means is triggered by said mixed signal when its amplitude exceeds said reference voltage.

3. A signal reject circuit according to claim 1 wherein said comparator means comprises a semiconductive device connected to receive biasing potentials and having three electrodes, one of said electrodes serving as one input terminal, a second of said electrodes, arranged common to the other electrodes, being held at a fixed biasing potential with respect to ground, said fixed biasing potential being equal to said fixed reference voltage, a third of said electrodes serving as one output terminal, whereby said triggering signal is developed between said third and said second electrodes.

4. A signal reject circuit comprising, in combination, a pair of emitter follower-connected transistors having their emitter electrodes connected in common, said common connection serving as a first input terminal for an AND gate, attenuator input means connected to base electrodes of each of said emitter follower trasistors for receiving and monitoring the amplitude of individual input signals to detect circuit non-linearity in order to provide a circuit reject output when, during a gating period, either of said individual input signals exceeds a desired level, said AND gate including a pair of diodes with a common electrode serving as a gate output terminal, a second input terminal for said AND gate for receiving an input signal during a gating period, voltage comparator means connected to a fixed reference voltage and connected to said gate output terminal for comparing the signal at said gate output with said fixed reference voltage, said input signal appearing at said second input terminal having an amplitude greater than that of said fixed reference voltage, and circuit reject output means connected to said comparator means for providing a reject output signal when said AND gate provides an output voltage of sufficient magnitude to enable said comparator means.

5. A signal reject circuit as defined in claim 4 including a resistor and a voltage source included in said AND gate providing a forward bias current flow through one of said diodes connected to said second input terminal thereby blocking said other diode during a non-gating period and whereby said gate output terminal is clamped to the voltage of said emitter electrodes of said pair of transistors during a gating period.

6. A signal reject circuit as defined in claim 4 including a third diode connected between said gate output terminal and said voltage comparator means, said third diode serving to couple said gate output voltage to enable said comparator means and thereafter to isolate said circuit reject output means from said pair of transistors.

7. A signal reject circuit as defined in claim 1 wherein said individual input terminals are connected to taps on a delay line which contains an amplified voltage wave pattern generated in response to a character transducing operation, said input terminals individualy diode connected to weighted resistors whose values compensate for attenuation of signals propagated along said delay line, and wherein said circuit causes an output monitoring signal thereby eliminating a false recognition of the sensed character due to nonlinearity of amplifying operation in response to overdriving signals.

8. A signal reject circuit according to claim 1, in which said AND gaing means comprises first and second diodes each having an anode and a cathode, the said predetermined signal being applied to the anode of the first diode, the anode of the second diode being adapted to receive said mixed signal, the cathodes being connected in common, and said common connection being connected through a resistor to a source of bias voltage, said predetermined signal being of negative polarity and of an amplitude greater than said fixed reference voltage, whereby said mixed signal appears at said common connection only during the presence of said negative predetermined signal.

(References on following page)

References Cited by the Examiner

UNITED STATES PATENTS

| | | | |
|---|---|---|---|
| 2,756,409 | 7/1956 | Lubkin | 340—149 |
| 2,783,453 | 2/1957 | Rose | 340—149 |
| 2,910,684 | 10/1959 | Jones | 340—149 |
| 2,924,812 | 2/1960 | Merritt | 340—149.1 |
| 2,927,303 | 3/1960 | Elbinger | 340—149.1 |
| 2,961,649 | 11/1960 | Eldredge et al. | 340—149.1 |
| 2,982,887 | 5/1961 | Seeley | 340—248 |
| 3,010,068 | 11/1961 | Ferguson | 340—248 |
| 3,092,809 | 6/1963 | Merrit et al. | 340—146.3 |
| 3,114,131 | 12/1963 | Furr et al. | 340—146.3 |

FOREIGN PATENTS

| | | |
|---|---|---|
| 785,853 | 11/1957 | Great Britain. |

NEIL C. READ, *Primary Examiner.*

IRVING SRAGOW, *Examiner.*

UNITED STATES PATENT OFFICE
CERTIFICATE OF CORRECTION

Patent No. 3,225,330 December 21, 1965

Harvey Rosenberg et al.

It is hereby certified that error appears in the above numbered patent requiring correction and that the said Letters Patent should read as corrected below.

Column 2, line 42, for "pointed" read -- printed --; column 3, line 22, for "on" read -- an --; column 4, line 24, after "t,", in italics, insert -- where t --; lines 31 and 32, at the end of the equation insert -- $\tau$ --; column 5, line 6, for "The" read -- By --; line 8, for "$\phi_{00}$, $\phi_{01}$" read -- $\phi_{00} > (\phi_{01}$ --; line 47, after "amplifier" insert -- outputs --; line 54, for "cricuit 50a" read -- circuit 50c --; same column 5, line 59, for "specific" read -- specified --; column 7, line 26, for "anode" read -- node --.

Signed and sealed this 20th day of December 1966.

(SEAL)
Attest:

ERNEST W. SWIDER
Attesting Officer

EDWARD J. BRENNER
Commissioner of Patents